Figure 1:
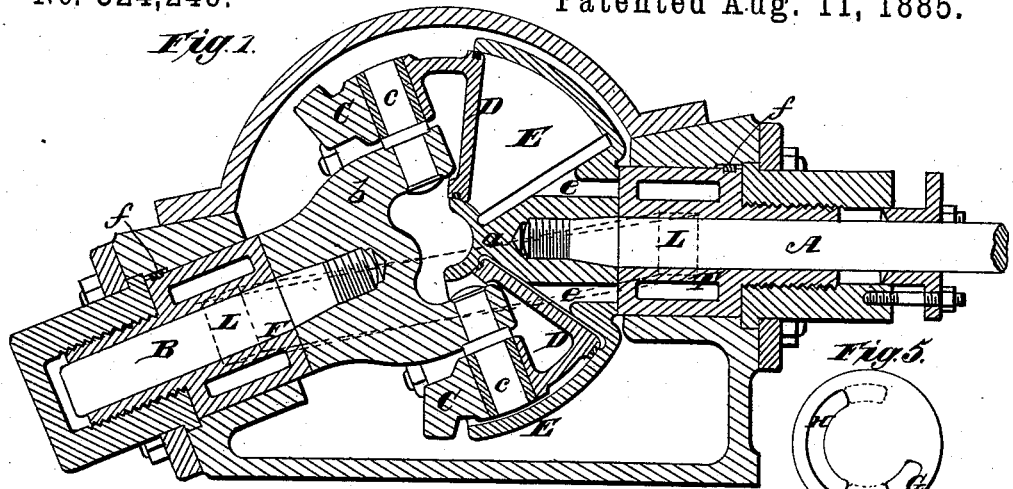

(No Model.)

J. FIELDING.
ROTARY MOTOR.

No. 324,246. Patented Aug. 11, 1885.

Witnesses
Robt Everett
Geo. W. Rea

Inventor
John Fielding
By James L. Norris
Atty

UNITED STATES PATENT OFFICE.

JOHN FIELDING, OF GLOUCESTER, COUNTY OF GLOUCESTER, ENGLAND.

ROTARY MOTOR.

SPECIFICATION forming part of Letters Patent No. 324,246, dated August 11, 1885.

Application filed May 25, 1885. (No model.)

*To all whom it may concern:*

Be it known that I, JOHN FIELDING, a citizen of England, residing at Gloucester, in the county of Gloucester, England, have invented a new and useful Rotary Motor Applicable as a Liquid Meter or Pump, of which the following is a specification.

When two revolving shafts whose axes are inclined to one another at a considerable angle—such as one hundred and fifty degrees—are connected together by a universal joint consisting of a gimbal-ring jointed at two opposite points to two arms projecting from the one shaft, and at two points ninety degrees from the former to two arms projecting from the other shaft, each of those points of the gimbal-ring, besides revolving around the point of intersection of the two axes, has a librating movement relatively to an imaginary central plane bisecting the angle at the intersection of the axes, and therefore moves from the one side of such a plane across it and to the other side during the one half of each revolution, and back during the other half-revolution. If, then, a boss in the form of a piston projected from the ring at one of the joints in the direction opposite to the arm which there connects the ring to the one shaft, and if this piston enters a cylindrical cavity carried on the other shaft, the librating movement above referred to would cause a to-and-fro reciprocation of the piston in the cylinder. As this movement is not in a straight line, but in the arc of a circle struck from the point where the axes of the shafts intersect, the cylinder has to be made as if its axis were bent to this curvature, so that it is really a portion of a bent tube, the piston having a corresponding form. Now, if, by means of a suitable slide or valve, fluid under pressure were admitted to the cylinder during the one half of each revolution of the shafts, and were emitted during the other half-revolution, the pressure of this fluid would cause the shafts to revolve, and, conversely, if the shafts were caused to revolve by extraneous power, fluid would be drawn into the cylinder during half of each revolution, and would be expelled during the other half-revolution.

My invention relates to the construction of apparatus which, acting in the manner set forth above, may be employed as a motor when it is supplied with fluid under pressure, or as a meter of liquid passed through it, or as a pump when it is driven by extraneous power.

In order to make the apparatus effective during both halves of each revolution, I arrange two such cylinders and pistons as I have referred to diametrically opposite to one another on one side of the ring, so that while the one cylinder is discharging the other is receiving fluid; and in order to provide against the dead-center at each change of direction of movement I preferably duplicate the arrangement by providing another pair of the cylinders and pistons at the extremities of a diameter at right angles to that which joins the former pair and on the other side of the ring.

For governing the admission and emission of fluid, I provide passages in revolving bosses carried on the shafts, presenting facings against which bear stationary slides, so that as ports in these facings pass in their revolution corresponding ports in the slides the fluid flows to and from each of the several cylinders alternately in the succession of their rotation.

The accompanying drawings represent the construction and arrangement of a rotary motor of the kind described, which may be worked by steam or other fluid under pressure.

Figure 5:
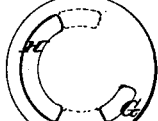
Figure 2:
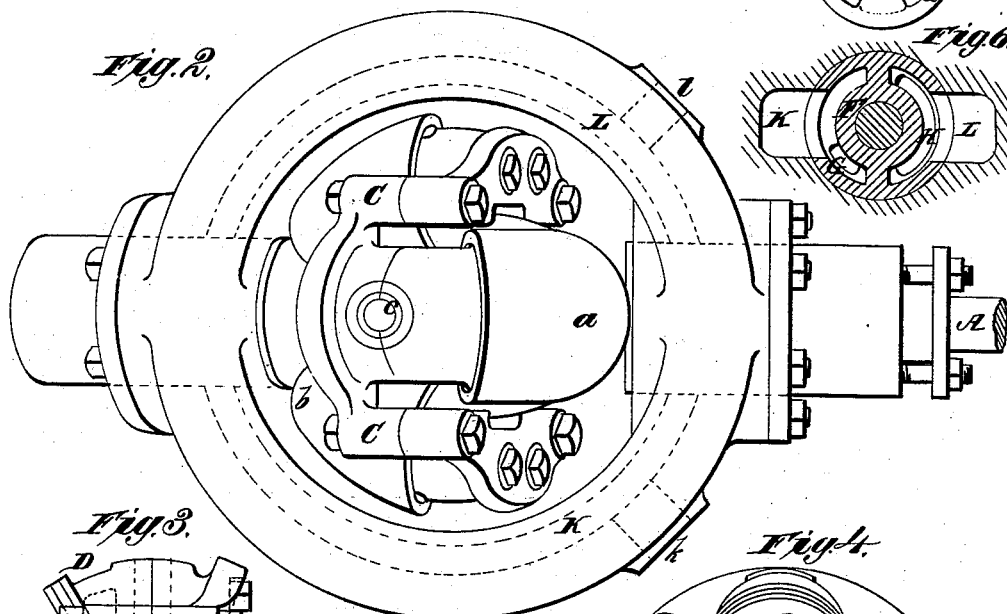
Figure 6:
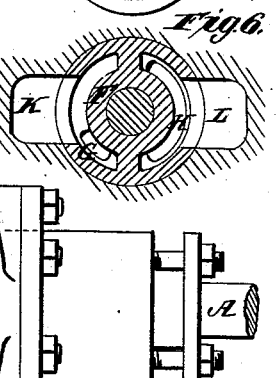
Figure 3:
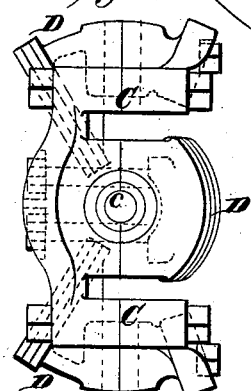
Figure 4:
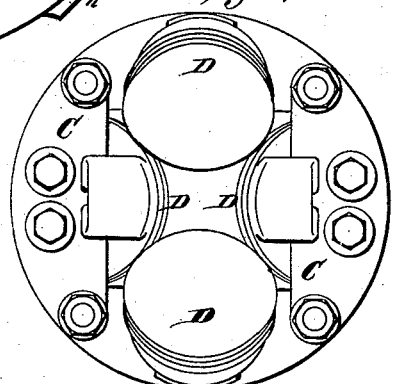

Figure 1 is a longitudinal section, and Fig. 2 is a plan. Figs. 3 and 4 are respectively side and front views of the gimbal-ring. Fig. 5 is a front view of the stationary slide and the facing on which it bears, and Fig. 6 is a section through the slide and the passages to and from it.

A and B are the two shafts, mounted in long bearings at an angle to one another, and having bosses *a b* fixed on them. The shaft B serves as a pivot, and does not communicate motion to other machinery.

C is the gimbal-ring, which is jointed by pins *c* to two arms projecting from the boss *a* and to two arms projecting from the boss *b*. The centers of the joints *c* are in one plane; but the ring C, as shown in Fig. 3, has recesses on each side, to allow play for the moving parts, and, for convenience of construction, is made in four pieces bolted together. From the ring C, on each side of it, project the two pistons D, each of which enters a cavity, E, which, as explained above, has the form of a portion of a bent tube, but which, for the sake of brevity, I will hereinafter term a "cylinder," as it plays the part of the cylinder of an ordinary engine. These cylinders are formed, two of them in the body of the boss $a$, and two in the body of $b$. Each cylinder has a passage, $e$, opening as a port in the facing, against which bears the slide F, which is prevented from revolving by a key, $f$. Within the body of the slide there is an annular chamber divided into two compartments, the one opening by a port, G, and the other by the longer port, H, to the facing. The slides F form bearings in which the shafts A and B revolve, and these slides are held within bosses of the fixed framing, which are connected together by two semi-annular passages, K and L, the passage K opening into the G compartment of each slide, and the passage L into the H compartment. The passage K receives at $k$ supply of steam or other working-fluid, and the passage L has an outlet, $l$, for discharge. As the two shafts revolve along with their cylinders E, and with the gimbal-ring C and its pistons D, the port $e$ of each cylinder, as it passes the port G of the stationary slide, admits fluid to the cylinder, and as it passes the port H of the slide it allows fluid to issue from the cylinder. The slide F being in each case fixed in such a position that its ports G and H communicate with $e$ during those parts of a revolution which correspond, respectively, with the outward and inward movements of the pistons D relatively to their cylinders E, the supply of steam or fluid under pressure causes the shafts to revolve; or if the shafts be caused to revolve by extraneous power, fluid is drawn in at $k$ and expelled at $l$. When steam or other elastic fluid is employed to work the motor, I make the inlet-ports G, as shown in Figs. 5 and 6, considerably shorter than the outlet-ports H, so that a comparatively small charge of elastic fluid may be admitted to each cylinder, in which it can act by expansion. When water or other liquid under pressure is employed, or when the apparatus is used as a meter or pump for liquid, the inlet-ports G are necessarily extended, so as to be open to $e$ during the whole outstroke in each case.

Having thus described the nature of my invention and the best means I know for carrying the same into practical effect, I claim—

In a motor applicable as a liquid meter or pump, two revolving shafts inclined to each other and connected by a universal joint, and the gimbal-ring of the joint carrying pistons working in cavities on the shaft, having the form of bent tubes, these cavities having passages for admission and emission of fluid, governed by stationary slides, all combined substantially as described.

In testimony whereof I have signed my name to this specification, in the presence of two subscribing witnesses, this 1st day of May, A. D. 1885.

JOHN FIELDING.

Witnesses:
 OLIVER IMRAY,
 JNO. P. M. MILLARD.